US006532639B2

(12) United States Patent
Ni et al.

(10) Patent No.: US 6,532,639 B2
(45) Date of Patent: Mar. 18, 2003

(54) HYDROFORMED TUBULAR STRUCTURES AND METHODS OF MAKING

(75) Inventors: Chi-Mou Ni, Troy, MI (US); Tehui Peng, Rochester Hills, MI (US); Thomas B. Bartholomew, Metamora, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/875,171

(22) Filed: Jun. 7, 2001

(65) Prior Publication Data

US 2002/0186999 A1 Dec. 12, 2002

(51) Int. Cl.[7] ................................................ B23P 17/00
(52) U.S. Cl. ........................ 29/421.1; 29/897.2; 72/61
(58) Field of Search ............................. 29/421.1, 897.2, 29/412, 416, 425; 403/231; 72/61, 62

(56) References Cited

U.S. PATENT DOCUMENTS

| 2,576,049 | A |   | 11/1951 | Shott ............................ 287/54 |
|-----------|---|---|---------|------------------------------------------|
| 2,881,017 | A |   | 10/1959 | Millar ........................... 287/54 |
| 5,720,092 | A | * | 2/1998  | Ni et al. ..................... 29/421.1 |
| 6,138,358 | A | * | 10/2000 | Marando ....................... 29/897.2 |
| 6,158,122 | A | * | 12/2000 | Skudutis ....................... 29/897.2 |
| 6,237,382 | B1| * | 5/2001  | Kojima et al. ................... 72/58  |
| 6,282,790 | B1| * | 9/2001  | Jaekel et al. ................. 29/897.2 |

* cited by examiner

Primary Examiner—Gregory M. Vidovich
Assistant Examiner—Stephen Kenny
(74) Attorney, Agent, or Firm—Laura C. Hargitt

(57) ABSTRACT

A hydroformed tubular structure includes at least two hydroformed members connected at a joint. At least one of said members includes a flattened portion having opposite sides in engagement. One of the sides engages and is secured to a mating portion of another of the members and a hydroformed conjugate portion is formed in the one side adjacent the flattened portion and is secured in a recess of the other member. A hydroformed structural portion extends from the conjugate portion in a direction away from the flattened portion. A method of making the structure includes the steps of placing a tubular member in a hydroforming die, filling the tubular member with hydroforming liquid, flattening at least one portion of the tubular member intermediate its ends by forcing opposite sides of the member into engagement upon closing of the die, the liquid in the member acting to prevent collapse of other portions of the tubular member than the flattened portions, hydroforming the member into a predetermined configuration including expanded conjugate portions adjacent the flattened portions, trimming the flattened portions of the member to form a plurality of separate hydroformed parts each having at least one flattened end portion with an adjacent expanded conjugate portion, and securing the flattened portion of a first one of the parts to a second part having a recess receiving the conjugate portion of the first part to form a secure joint connecting the first and second parts.

5 Claims, 6 Drawing Sheets

HYDROFORMED TUBULAR STRUCTURES AND METHODS OF MAKING

TECHNICAL FIELD

This invention relates to hydroformed tubular structures including hydroformed joints at which members or parts of the structures are fixed to one another and to methods of making such hydroformed joints. In particular, the invention involves hydroformed conjugate joints, such as might be used in vehicle structures.

BACKGROUND OF THE INVENTION

The application of hydroformed tubular components in vehicle structure assembly is attracting increasing interest in the automobile industry at this time. One of the important factors for successful applications of this technology is to effectively join two or more essentially closed box section components together in a manner which provides satisfactory structural performance as well as manufacturing and assembly efficiency.

Traditional joining methods for a typical lap joint are shown in FIGS. 1 and 2, and for a T-joint in FIGS. 3 and 4. These methods usually require relatively expensive secondary operations after the hydroforming process to end trim or cut the ends of the box sections of the joining members. A saw cut, plasma cut, or laser cut process is usually employed in these secondary operations which may involve significant tooling costs, require control of trimming quality and have excessive cycle time for completing these operations. In addition, the traditional hydroformed joint designs may have relatively weak stiffness of their box sections in resisting local buckling.

In a conventional lap joint 10 illustrated in FIGS. 1 and 2, a trimmed hydroformed end 12 of one member 14 is slid inside a trimmed hydroformed member 16 through a cutout 18 in a side 20 of the member 16. The assembled components 14, 16 are then fixed together, such as by through bolts or welding.

In a conventional T-joint 22 shown in FIGS. 3 and 4, one hydroformed tubular member 24 has opposite sides 26 cut out to form depending legs 28. In assembly, the legs 28 straddle opposite sides 30 of a second hydroformed tubular member 32 to form the T-joint 22, the members being preferably welded together. Both of these arrangements form box section structures with limited structural strength, particularly for bending and torsional loads.

SUMMARY OF THE INVENTION

The present invention provides improved joint structures for hydroformed tubular members in which the joint structures are formed by simplified manufacturing processes that reduce the cost of manufacturing. The strength of the resulting hydroformed tubular structure may also be increased.

For both lap joint and T-joint structures, a hydroformed tubular structure according to the invention connects at least two hydroformed members at a joint including, in at least one of the members, a flat portion at one end with an adjacent hydroformed conjugate portion. The conjugate portion is adapted to engage a recess in a second member and the flat portion is adapted to be secured to an adjacent portion of the second member.

In a preferred embodiment of a lap joint, two or more members having hydroformed conjugate ends may be formed from a single tubular member in a single hydroforming process. The resulting hydroformed ends each include a flattened portion offset toward one edge and having opposite sides smashed into engagement, and a hydroformed conjugate portion offset toward an opposite edge and having one side extending upward from the flat portion. The similarly formed ends are mated by having the raised conjugate portions of the two ends each engage the flat portions of the other member. The flat portions thus form the recesses in which the conjugate portions are received. The resulting joint may be held in assembly by bolts extending through openings in the conjugate portions and their associated flat portions or the joint may be secured by welding.

A method of making a hydroformed tubular structure with the lap joint as described above involves: placing in a hydroforming die a tubular member having opposite ends, filling the tubular member with hydroforming liquid prior to completely closing the die, flattening at least one portion of the tubular member between its ends by forcing opposite sides of the member into engagement upon completing closing of the die, and increasing the pressure of the liquid in the member to hydraulically expand or hydroform the member against the surrounding die to obtain a predetermined configuration. The hydroformed shape includes expanded conjugate portions adjacent the flattened portion. The engaged sides of the flattened portion must allow sufficient liquid flow therethrough to permit pressurizing the member from one of the ends. The flattened portions of the member are then trimmed to form a plurality of separated hydroformed parts, each having at least one flattened end portion with an adjacent expanded conjugate portion. Each joint is then formed by securing the flattened portion of a first one of the parts to a conjugate portion of a second part having a recess receiving the conjugate portion of the first part.

In forming a lap joint, the first and second parts may be formed from the same hydroformed member. The flattened portions are located at trimmed ends separated in the trimming step, the trimmed ends having interengaging expanded conjugate portions secured to the flattened portions of the other part to form the joint. In forming a T-joint, the first part includes a flattened end with an inwardly adjacent expanded conjugate portion and the second part is formed as a tubular hydroformed member with a recess in part of one side so that the flattened end is secured to that side adjacent the recess and the conjugate portion is received in the recess.

These and other features and advantages of the invention will be more fully understood from the following description of certain specific embodiments of the invention taken together with the accompanying drawings.

DESCRIPTION OF THE PREFERRED EMBODIMENT

Figure 5:
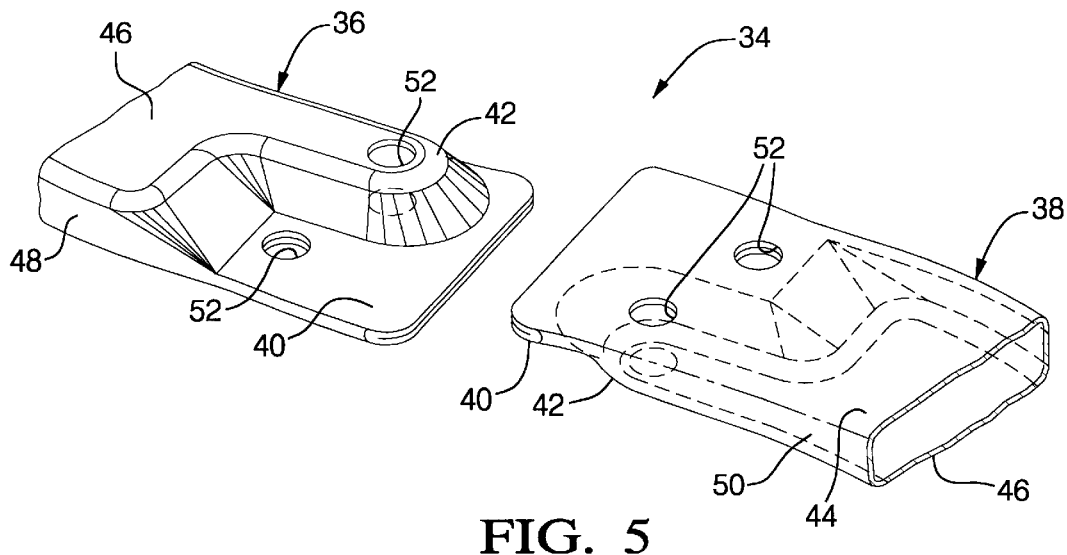
FIGS. 5 and 6 are pictorial views showing a hydroformed structure with a lap joint formed according to the invention and illustrated in respective exploded and assembled conditions.
Figure 6:
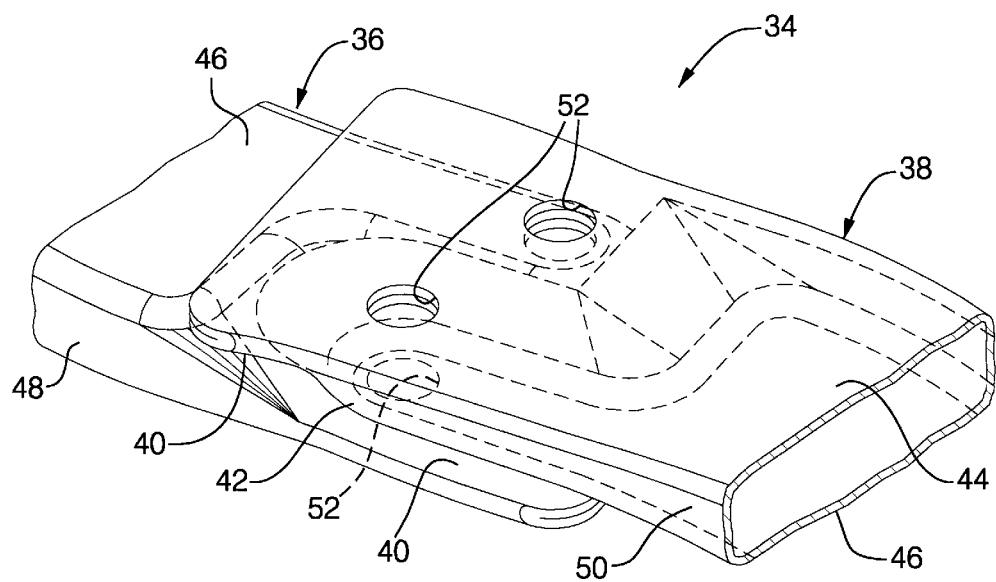

Referring now to FIGS. 5 and 6 of the drawings, numeral 34 generally indicates a hydroformed tubular structure shown in exploded (FIG. 5) and assembled (FIG. 6) conditions. Structure 34 is formed by two similar hydroformed members 36, 38 each including an end having a flattened portion 40 toward one edge and a raised hydroformed conjugate portion 42 toward an opposite edge. Both the flattened and conjugate portions are formed with opposite sides 44, 46 which, at their ends, are smashed or flattened to engagement with one another. The smashed sides are thus mutually supported in the flattened portions but have sufficient spacing at points between them to allow hydroforming liquid, such as water, to flow through the flattened ends. Inwardly adjacent the flattened and conjugate portions, the members 36, 38 include tubular structural portions 48, 50 which may extend to any length to form a complete structure, not shown.

Figure 1:
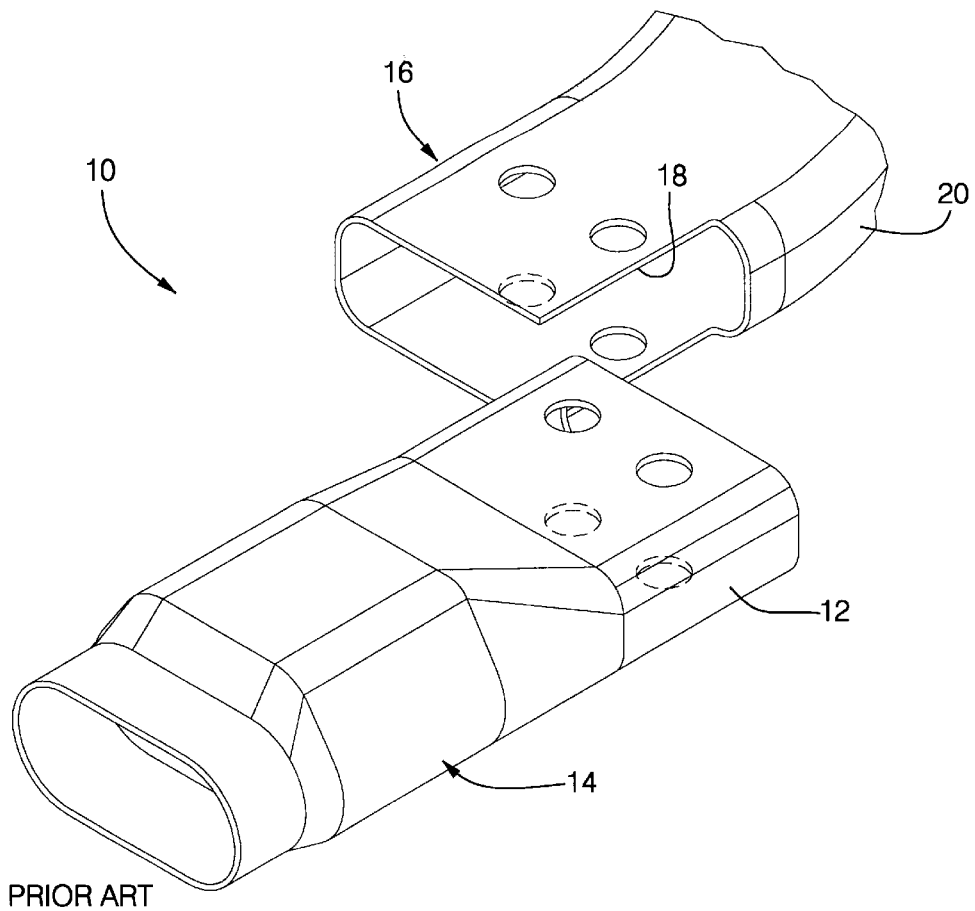
FIGS. 1 and 2 are pictorial views of a conventional prior art lap joint design illustrating the joint in respective exploded and assembled conditions.
Figure 2:
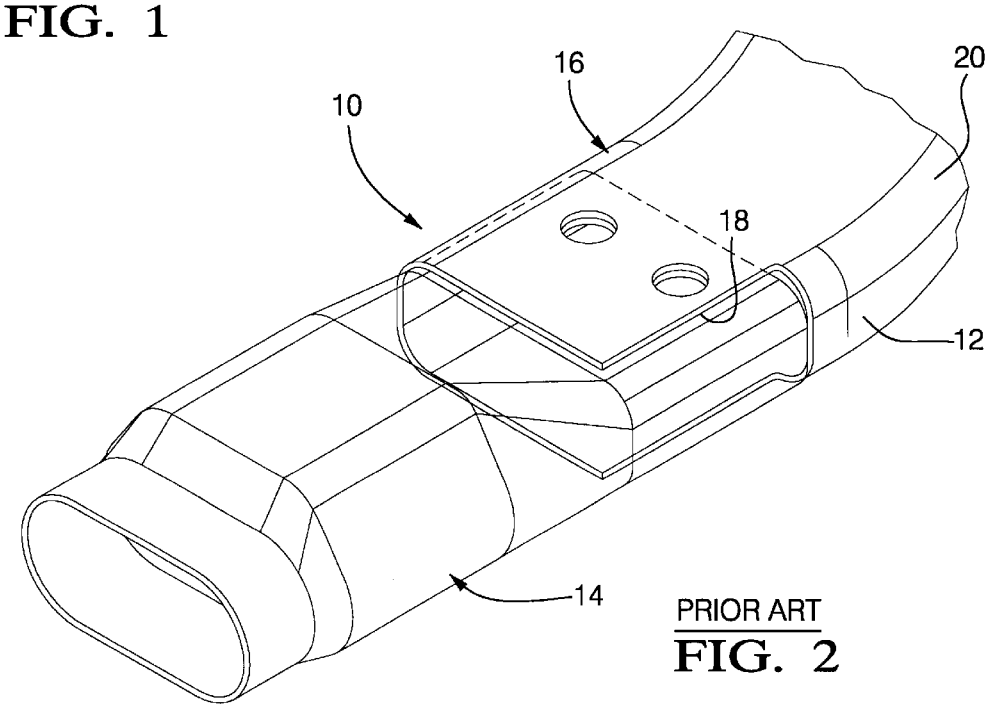
Figure 9:
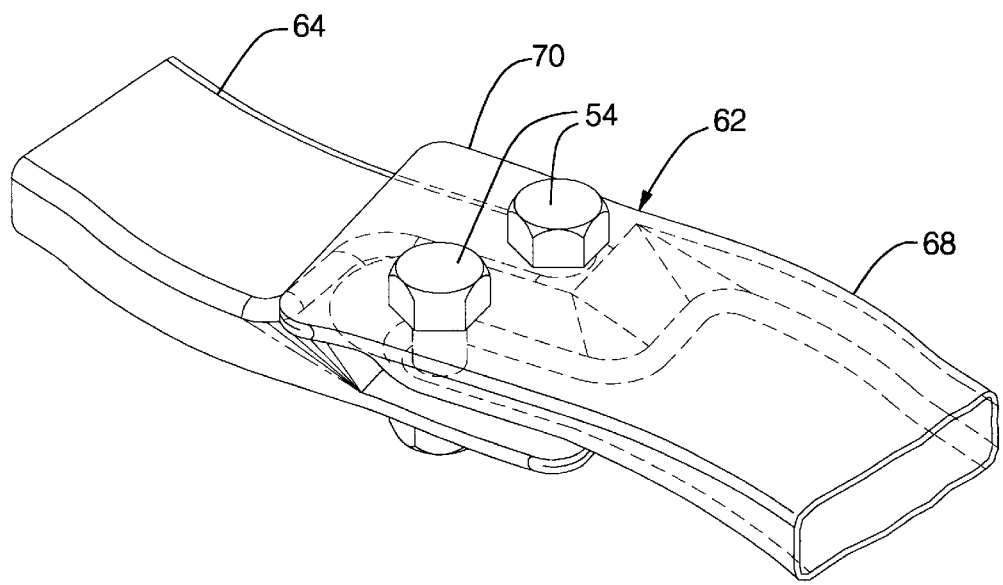
FIG. 9 is a pictorial view showing an assembled lap joint made from the trimmed and cut ends formed from the hydroformed member of FIG. 8.

In assembly, as shown in FIG. 6, the flattened ends of the members are overlapped so that the raised conjugate portion 42 of each member engages the flattened portion on the inner side 46 of the other member. Openings 52 are cut through both the conjugate portions 42 and their associated flattened portions 40 to provide aligned openings 52 receiving through bolts 54, as shown in FIG. 9. The bolts 54 secure the members 36, 38 in assembly to complete the improved lap joint configuration. The resulting assembly provides a rigid lap joint having increased strength over that of the prior art assembly of FIGS. 1 and 2 and is able to be manufactured by a simplified process to be subsequently described.

Figure 7:
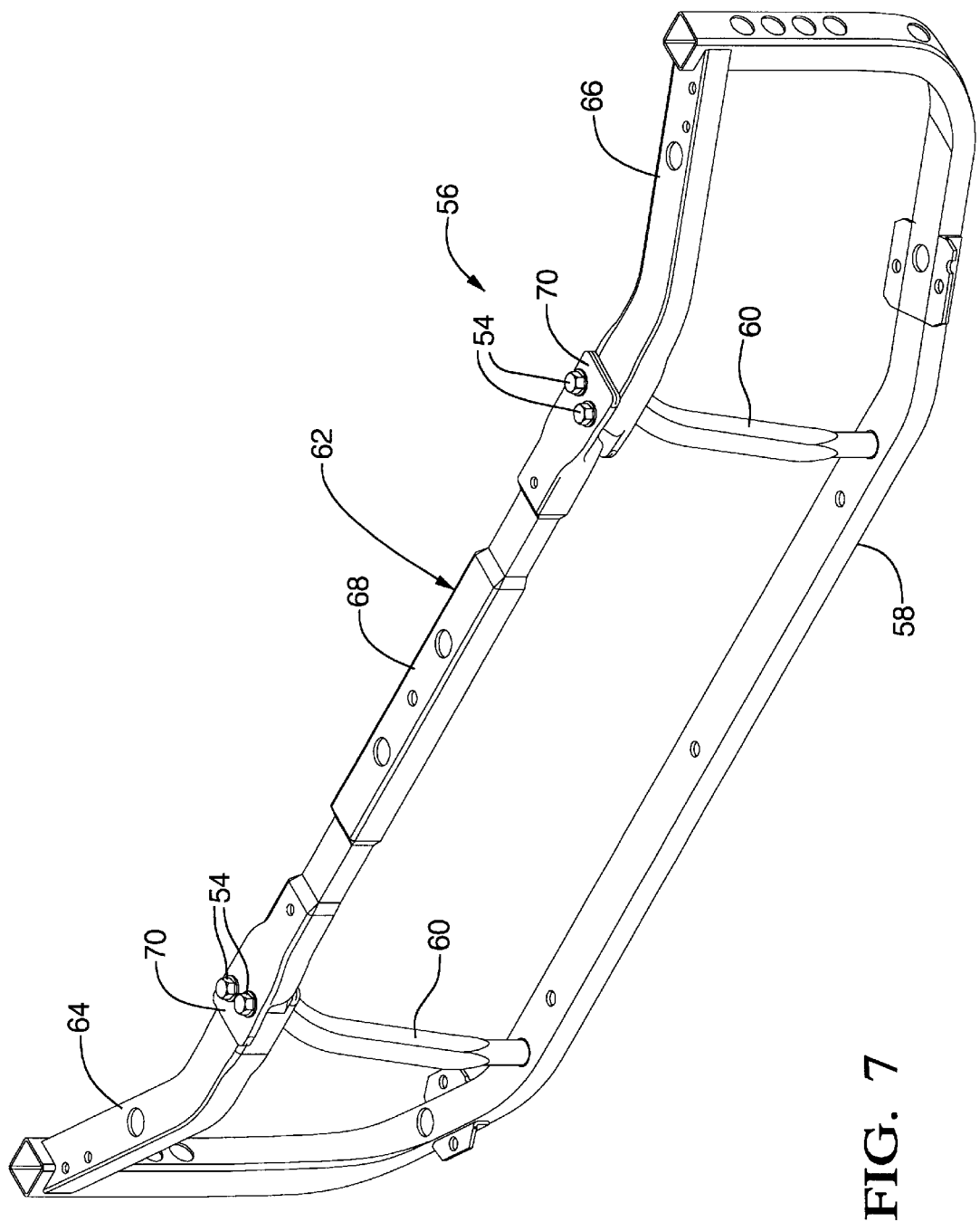
FIG. 7 is a tubular hydroformed radiator support assembly including an upper frame assembly utilizing dual lap joints according to the invention.

Referring now to FIG. 7 of the drawings, there is shown a tubular hydroformed radiator support assembly 56 made up of six hydroformed tubular members fastened together by a combination of welding and bolts. Assembly 56 includes a U-shaped lower support 58 having upturned vertical ends, a pair of vertical intermediate supports 60 and an upper subassembly 62. The subassembly includes right and left members 64, 66 (as installed in a vehicle) connected with a center member 68 by lap joints 70 formed according to the invention and of the type illustrated in FIGS. 5, 6 and 9. The center member is secured at the joints 70 to the right and left side members 64, 66 by bolts 52 so that the center member can be removed from the assembly in order to service the radiator or engine, not shown, of a vehicle.

Figure 8:
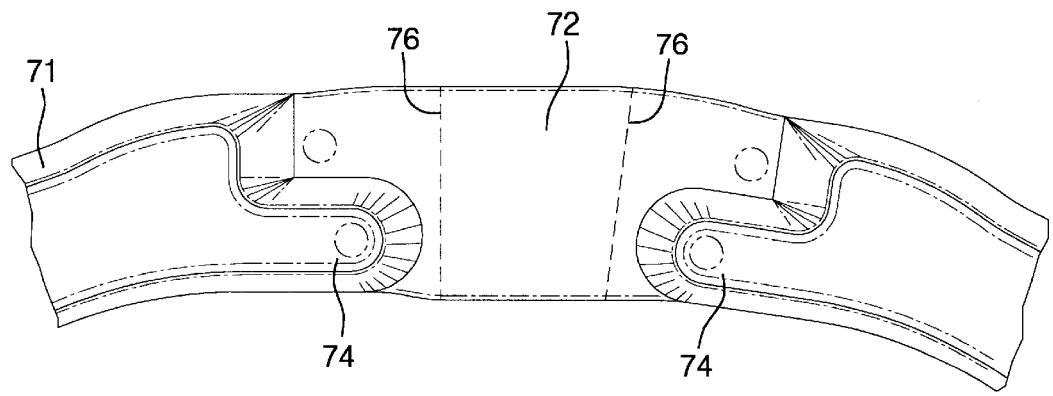
FIG. 8 is an enlarged pictorial view of a hydroformed member having adjacent flattened and conjugate portions ready for trimming to form separate ends of parts to be assembled as a lap joint in a subsequent step.

Components of the upper subassembly 62 are manufactured in an efficient manner utilizing the following steps of a method according to the invention. In the method, the side members 64, 66 and the bolted in center member 68, are formed in a single hydroforming process from a single cylindrical tube 71. This tube is placed in a hydroforming die, not shown, the tube 71 having opposite ends, not shown, at least one of which is connected to receive hydroforming liquid while in the die. Before full closing of the die, the tube 71 is filled with hydroforming liquid, such as water. The die is then closed and is configured in a manner to flatten portions of the tube intermediate its ends resulting in a configuration as shown in FIG. 8. This configuration includes a flattened center section 72 with raised conjugate portions 74 extending into the flattened section 72 at opposite ends thereof. The center section 72 is smashed together so that opposite sides of the tube 71 are in engagement but there are sufficient spaces between the sides to allow a flow of water through the flattened portions between the unflattened portions of the original tube. The fact that the tube is filled with water prior to closing of the die prevents the flattening of the center section 72 to cause collapse of the adjacent conjugate portions and other unflattened portions of the tube 71.

The tube 71 with its spaced flattened sections 72 is then hydroformed by increasing the pressure of the liquid within the die so that the various left, right and center sections of the resulting product are expanded into their desired configurations as determined by the internal shapes of the forming dies. After hydroforming, the one-piece hydroformed tube 71 is removed from the die and the outer ends are trimmed if necessary. The flattened center sections 72 are then also trimmed along dashed lines 76 using a simple shear or trim die, so that the flattened portions are separated into three individual members or parts. The right and left members 64, 66 are thus formed with inner ends having the configurations illustrated in FIGS. 5 and 6 of the drawings and the center member 68 when turned over has its opposite ends formed with the mating features of the lap joints of FIGS. 5 and 6. The ends of the members are then provided with bolt openings 52 and the three members may then be bolted together to provide the subassembly 62, as illustrated in FIG. 7, as part of the radiator support assembly 56.

FIG. 9 illustrates a bolted lap joint of the type shown in FIGS. 5, 6 and 7, wherein the adjacent members 64, 68 are secured by bolts 52.

Figure 10:
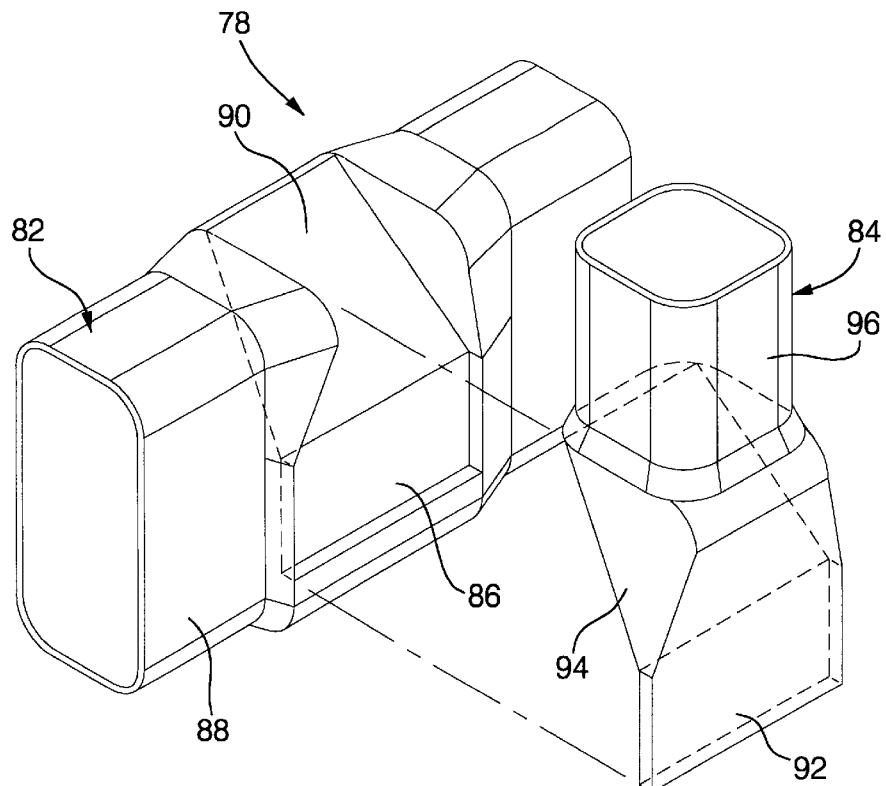
FIGS. 10 and 11 are pictorial views illustrating a hydroformed tubular structure connected by a T-joint according to the invention and shown in respective exploded and assembled conditions.
Figure 11:
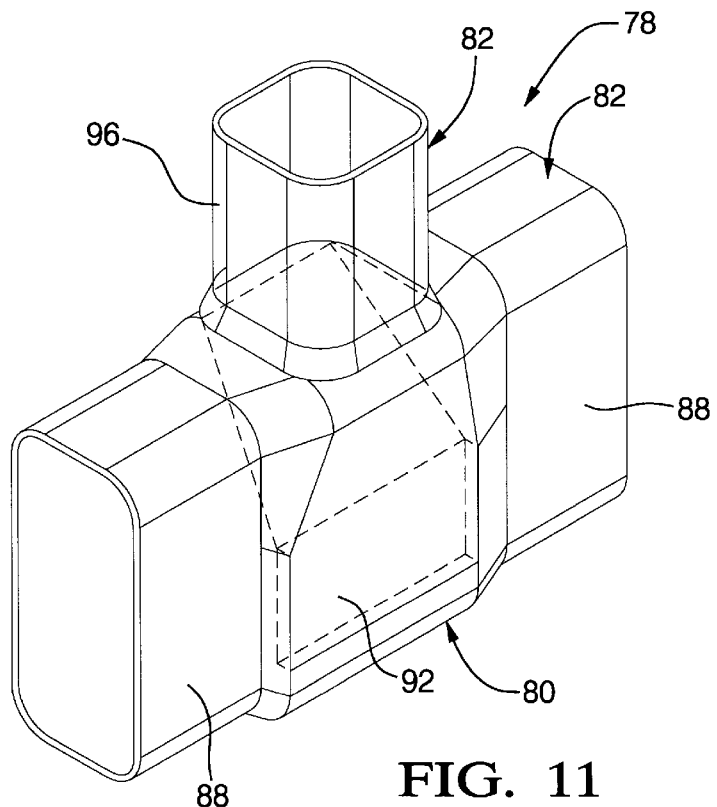

Referring now to FIGS. 10 and 11, there is shown a hydroformed tubular structure 78 having an improved design of T-joint 80 interconnecting hydroformed members 82, 84. Member 82 is a hydroformed tube having between its ends a slightly recessed portion 86 in a lower portion of one side 88 and having a deeper angular recess 90 formed in an upper part of the same side 88. Member 82 is connected in the T-joint 80 with a second hydroformed member 84 which has at one end a flattened portion 92 extending completely across the end and having sides forced together in contact as in the previously described flattened portions. As before, this allows the passage of water through the flattened portion to another connecting member, not shown, when located in a hydroforming die, also not shown. Adjacent the flattened portion 92, member 84 includes a raised conjugate portion 94 having an angular configuration extending from the flattened portion to the far side of a rectangular tubular structural portion 96 of member 84.

In assembly, the angular raised conjugate portion 94 of member 84 is received within the angular recess 90 of member 82 with the parts configured for relatively close mating assembly. Flattened portion 92 of member 84 likewise is received within the slightly recessed portion 86 of member 82. The assembled components are then secured together, preferably by welding around the exposed edges of the mating portions of the joint.

Figure 3:
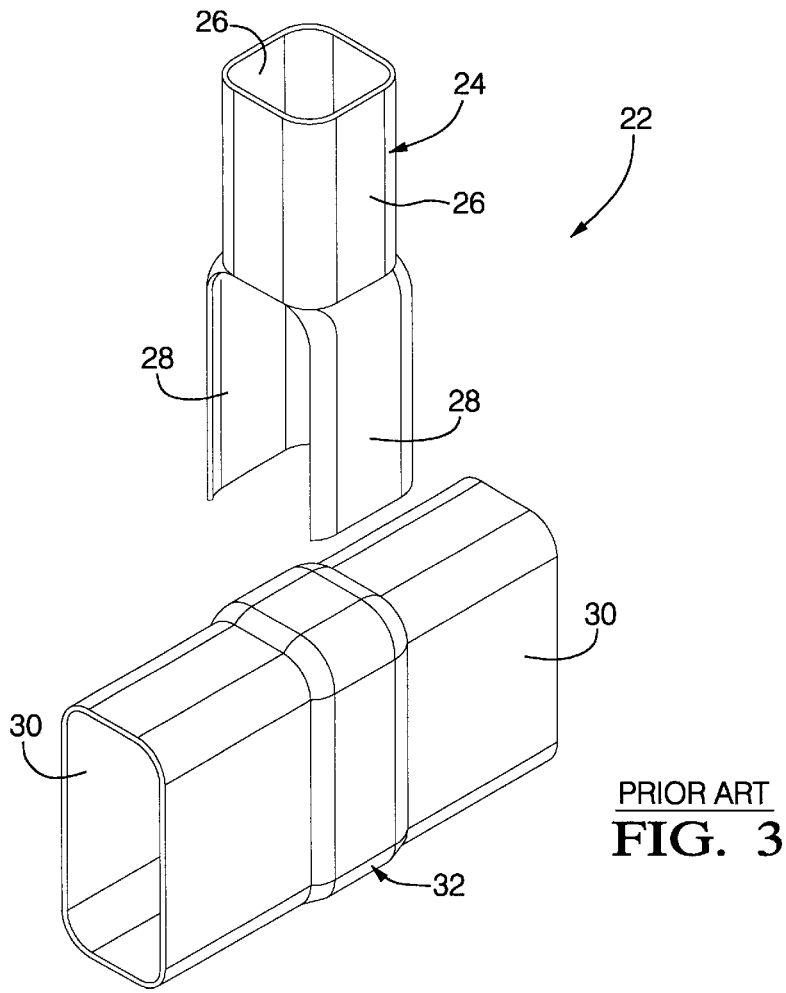
FIGS. 3 and 4 are pictorial views illustrating a conventional prior art T-joint design in respective exploded and assembled conditions.
Figure 4:
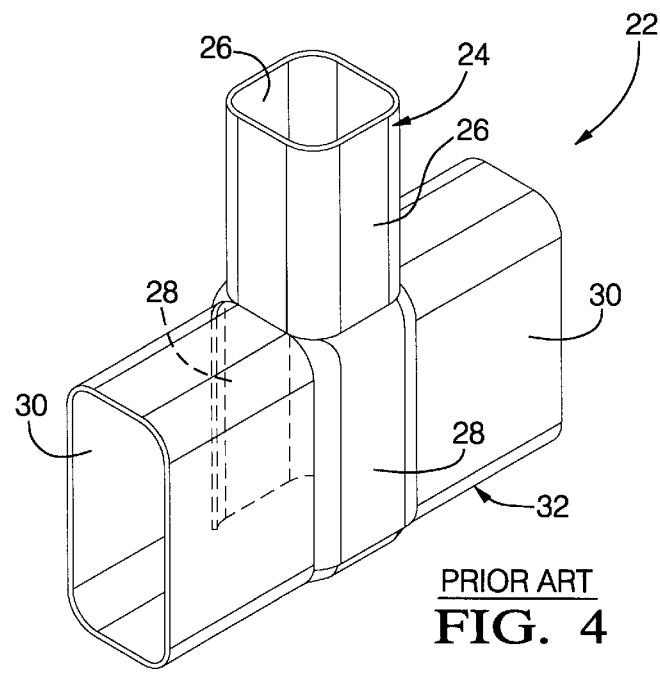

The components of the T-joint are also capable of being formed by simple hydroforming and trimming processes. The resulting joint provides increased strength as compared to the prior art joints of FIGS. 3 and 4.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A method of making a hydroformed tubular structure including a connecting joint, said method comprising the steps of:

placing in a hydroforming die a tubular member having opposite ends and adapted to be hydroformed in the die;

filling the tubular member with hydroforming liquid prior to completely closing the die;

flattening at least one portion of the tubular member intermediate its ends by forcing opposite sides of the member into engagement upon completing closing of the die, the die being configured to flatten said portions of the tubular member upon closing of the die, the liquid in the member acting to prevent collapse of other portions of the tubular member than the flattened portions;

increasing the pressure of the liquid in the member to hydraulically expand the member against the surrounding die to hydroform the member into a predetermined configuration including expanded conjugate portions adjacent the flattened portions, the opposite sides of the flattened portions allowing sufficient liquid flow therebetween to permit pressurizing the member from one of the ends;

trimming the flattened portions of the member to form a plurality of separate hydroformed parts each having at least one flattened end portion with an adjacent expanded conjugate portion; and securing the flattened portion of a first one of the parts to a second part having a recess receiving the conjugate portion of the first part to form a secure joint connecting the first and second parts.

2. A method as in claim 1 wherein the first and second parts are formed from the same hydroformed member and said flattened portions are located at trimmed ends separated in the trimming step, said trimmed ends having interengaging flattened and conjugate portions secured together to form the joint.

3. A method as in claim 2 wherein said trimmed ends are connected in an end lap joint.

4. A method as in claim 1 wherein said second part is formed with a recess in a side of a tubular portion thereof, the first part having a flattened end and an inwardly adjacent expanded conjugate portion, wherein the flattened end is secured to said side adjacent the recess and the conjugate portion is received in the recess.

5. A method as in claim 4 wherein the first and second parts are connected on a T-joint.

* * * * *